No. 840,165. PATENTED JAN. 1, 1907.
J. R. SIMPSON.
BUSHING AND PROCESS OF MAKING SAME.
APPLICATION FILED FEB. 9, 1906.
2 SHEETS—SHEET 1.
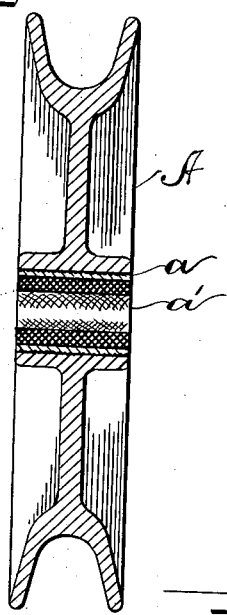
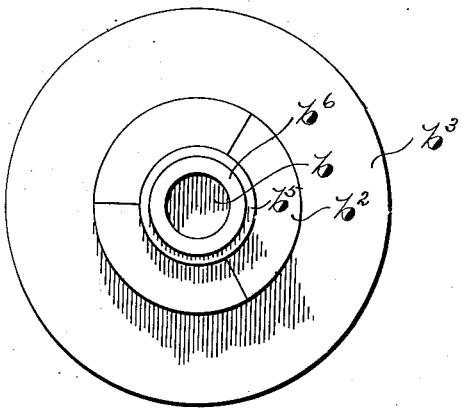
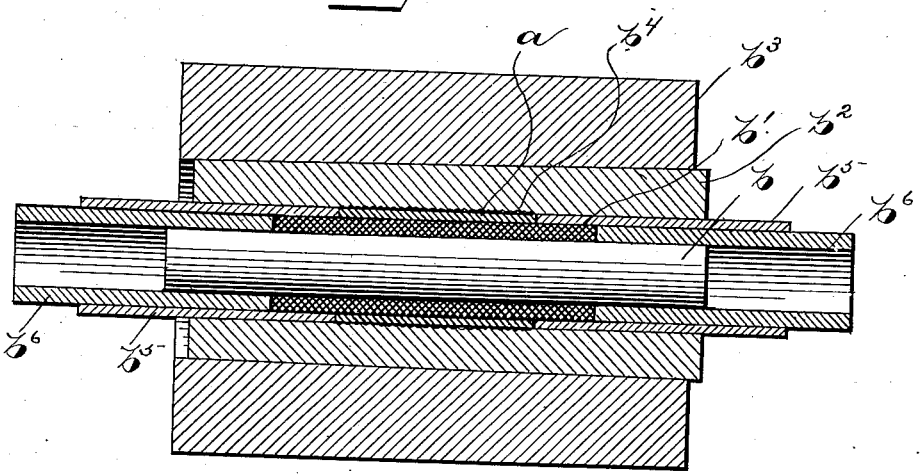
Witnesses
Inventor
John R. Simpson
By
Attorneys No. 840,165. PATENTED JAN. 1, 1907.
J. R. SIMPSON.
BUSHING AND PROCESS OF MAKING SAME.
APPLICATION FILED FEB. 9, 1906.
2 SHEETS—SHEET 2
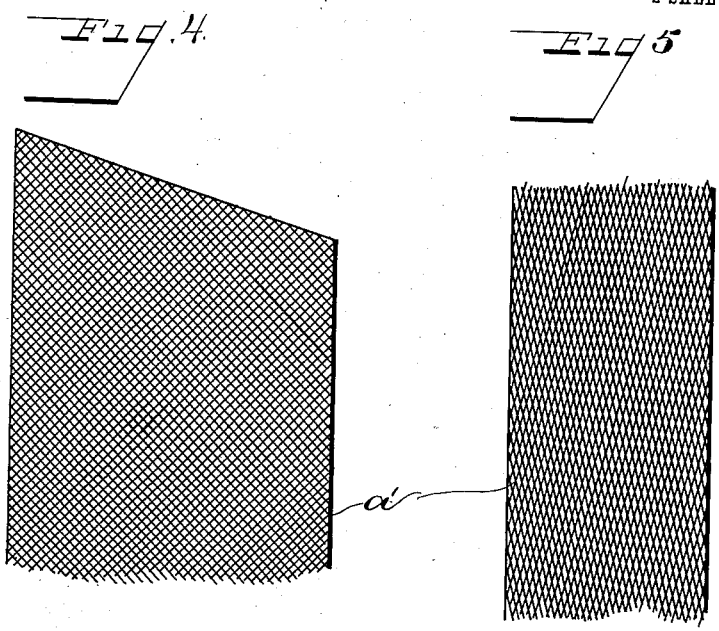
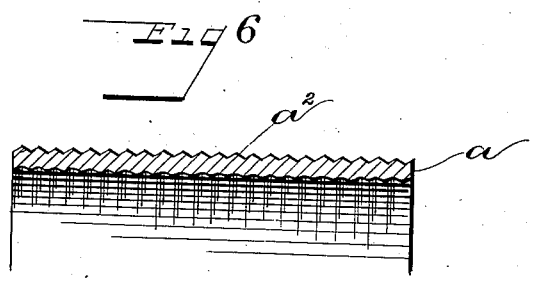
Witnesses
Inventor
John R. Simpson
Attorneys

UNITED STATES PATENT OFFICE.

JOHN R. SIMPSON, OF TROY, OHIO.

BUSHING AND PROCESS OF MAKING SAME.

No. 840,165.        Specification of Letters Patent.        Patented Jan. 1, 1907.

Application filed February 9, 1906. Serial No. 300,345.

*To all whom it may concern:*

Be it known that I, JOHN R. SIMPSON, a citizen of the United States, residing at Troy, in the county of Miami and State of Ohio, have invented certain new and useful Improvements in Bushings and Processes of Making the Same, of which the following is a specification.

My invention relates to journal-box linings, and particularly to interchangeable bushings having an efficient lubricant incorporated in the structure, and the method of making same, and is particularly adapted for trolley-wheels of traction-cars, but is not limited to such use.

On account of the rough usage and exposure to dust and grit to which trolley-wheels are subjected it is highly desirable, but has been found extremely difficult, to provide proper lubrication for the journal-bearings of the trolley-wheels, thereby necessitating the frequent replacement of the wheel or bearing.

The object of the present invention is to provide a simple and comparatively cheap interchangeable bushing which may be highly charged with graphite, grease, or other lubricant or antifriction material and which will retain said lubricant through a comparatively long period of time, thus adding greatly to the life of the bearing.

A further object is to provide a simple and practical method of forming such a bushing.

With the above primary and other incidental objects in view the invention consists of the device and parts or their equivalents and the method of construction hereinafter described, and set forth in the claims.

In the drawings, Figure 1 is a sectional view of a trolley-wheel with the improved bushing in place. Fig. 2 is an end view of the forming mechanism by which the bushing is constructed. Fig. 3 is a longitudinal sectional view of the forming mechanism. Fig. 4 is a view showing the arrangement of warp and woof in the metallic fabric before compression. Fig. 5 shows the relative arrangement of the warp and woof after compression. Fig. 6 is an enlarged detail view of a portion of the tube after the completion of the forming operation.

Referring by letter to the drawings, A represents the trolley-wheel having a central bore in which is inserted a bushing comprising a sleeve $a$, of comparatively thin walls, and a portion $a'$, of non-abrasive metallic fabric, highly charged with lubricant or antifrictional substance and compressed into tubular form within the sleeve $a$. The metallic fabric most preferable is an open-mesh fabric of a soft non-abrasive material, such as copper or some softer grades of brass.

The piece of fabric employed is somewhat longer than the sleeve $a$ and is cut bias, with the warp and woof at right angles to each other and at an angle of substantially forty-five degrees with the respective sides of the strip, as in Fig. 4. Lubricant is thoroughly rubbed into the meshes of the fabric, which is then wrapped a number of times about a mandrel $b$, as at $b'$, Fig. 3. The mandrel $b$, surrounded with the fabric thus charged with lubricant, is inserted in the sleeve $a$ and the whole placed in the three-part die $b^2$. The three-part die is formed slightly tapering to correspond with the bore of a surrounding sleeve $b^3$. The middle portion of the die $b^2$, at which is located the tube $a$ when in proper position, is slightly corrugated, as at $b^4$, to produce slight peripheral serrations or corrugations on the exterior of the tube $a$, as hereinafter described. Sleeves $b^5$ $b^5$ are provided, which confine and guide the protruding ends of the metal fabric while it is being compressed. Hollow plungers $b^6$ $b^6$, surrounding the ends of the mandrel $b$ and within the sleeves $b^5$ $b^5$, bear upon the extended ends of the fabric. The device is placed in a power-press of any suitable construction, and pressure is applied to the plungers $b^6$ $b^6$ until the fabric is compressed to a length equal to that of the sleeve $a$. By removing the three-part die $b^2$ from the sleeve $b^3$ the completed bushing is easily discharged. The mandrel $b$ defines the bore of the finished bearing.

When pressure is applied to the respective plungers $b^6$, the warp and woof of the metallic fabric change their relative arrangement and form a more acute angle with each other, as in Fig. 6. The elongation of the strip of metallic fabric incident to the lateral compression thereof causes the respective convolutions of fabric to increase diametrically and expand the tube $a$ within the three-part die. The serrated interior $b^4$ of the die causes similar peripheral serrations $a^2$ about the exterior surface of the tube $a$ upon the expansion thereof. The pressure under which the serrations are formed on the outside of the tube will give to the tube *a* a crenate interior configuration, as shown in Fig. 6. It has been found in practice that when partially compressed to the required degree the respective convolutions of fabric will expand diametrically and leave an intervening space between the inner layer of fabric and the mandrel *b*. The compression causes the lubricant to some extent to be squeezed out of the meshes of the fabric into the intervening space, which constitutes the bearing-surface of the finished bushing. Upon further compression the respective convolutions of fabric will collapse or buckle into irregular configuration, which assists in retaining the lubricant in place. The undulating or crenate interior of the tube *a*, formed as hereinbefore mentioned, assists to retain the lubricant-charged fabric within the tube *a*, while the exterior serrations of the tube permit the tube to be more readily adjusted to slightly irregular openings in the trolley-wheels and, further, serve to retain the bushing in place.

Any suitable lubricant may be employed; but it has been found in practice that graphite in a plastic condition or a mixture formed of graphite with rosin or shellac and turpentine or alcohol is most desirable; but the invention is not limited to the use of such lubricant. It has further been found desirable to include in the lubricating mixture fine filings or subdivided particles of babbitt, solder, or other antifriction metal. After the completion of the forming operation the finished bushing is heated or baked, which adds to the efficiency of the bearing, both as to lubricating qualities and solidity of the completed article, by partially carbonizing the binding material for the lubricant, and, further, by the fusing of the particles of babbitt or solder the respective convolutions of metallic fabric are united in a solid structure.

It will be seen that the bushing thus constructed will be highly charged with lubricant and possess great wearing qualities and, further, that it is simple and easily constructed without the use of complicated or expensive mechanism.

Having thus described my invention, I claim—

1. The herein-described method of manufacturing journal-bearings which comprises employing a sleeve, a piece of metal fabric longer than said sleeve rolled upon itself and inserted therein, said fabric being previously charged with a lubricant, and applying pressure to the protruding ends of said fabric to compress said fabric to a length substantially equal to that of the sleeve.

2. As an article of manufacture, a journal-bearing comprising a sleeve having corrugations on the exterior thereof, a lining for said sleeve of metallic fabric arranged in convolute form and charged with lubricant.

3. As an article of manufacture, a journal-bearing comprising a sleeve having an undulating or crenate interior, a lining for said sleeve of metallic fabric arranged in convolute form and charged with lubricant.

4. As an article of manufacture, a journal-bearing comprising a sleeve having corrugations on the exterior thereof, and an undulating or crenate interior, a lining for said sleeve of metallic fabric arranged in convolute form and charged with lubricant.

5. As an article of manufacture, a journal-bearing comprising a sleeve, a strip of metallic fabric having the warp and woof respectively thereof arranged at an angle with the respective edges of the strip, said strip of fabric being arranged in convolute form within said sleeve and charged with lubricant, substantially as specified.

6. As an article of manufacture, a journal-bearing comprising a sleeve having corrugations on the exterior thereof, and an undulating or crenate interior, a lining for said sleeve comprising a strip of metallic fabric having its warp and woof angularly arranged with the respective edges of the strip of fabric, said metallic fabric being charged with lubricant, substantially as specified.

7. As an article of manufacture, a journal-bearing comprising a sleeve, a lining for said sleeve consisting of a strip of metallic fabric in convolute form, the respective convolutions of said fabric being collapsed or buckled, and lubricant within said fabric, substantially as described.

8. The herein-described method of manufacturing journal-bearings which comprises employing a sleeve, a strip of metallic fabric having the warp and woof angularly arranged, said piece of fabric being of greater dimensions than the length of said tube, charging said fabric with lubricant, rolling said lubricant-charged metallic fabric upon itself and inserting it within the sleeve, applying pressure to the projecting ends of said fabric, whereby the fabric will be compressed within said sleeve causing said sleeve to expand in irregular outline and the respective convolutions of said fabric to collapse or buckle, substantially as specified.

9. The herein-described method of manufacturing journal-bearings which comprises employing a sleeve, a strip of metallic fabric, charging said fabric with a mixture comprising a lubricant, and a binder therefor, said mixture also containing particles of antifriction metal, rolling the said lubricant-charged metallic fabric upon itself, and inserting within the sleeve, applying pressure to the projecting ends of said fabric, whereby the fabric will be compressed within the sleeve and subsequently baking the structure thus produced, whereby the particles of antifrictional metal will be fused and unite the respective convolutions of the metallic fabric, substantilaly as specified.

10. As an article of manufacture, a journal-bearing comprising a sleeve, a piece of metallic fabric in convolute form, a lubricating mixture comprising a lubricant with binding material within the meshes and convolutions of said fabric, the respective convolutions of the fabric being united by particles of non-abrasive metal, substantially as specified.

In testimony whereof I have hereunto set my hand this 22d day of January, A. D. 1906.

JOHN R. SIMPSON.

Witnesses:
CHAS. I. WELCH,
CLARA GALLAGHER.